United States Patent [19]

Holloway

[11] Patent Number: 5,080,850

[45] Date of Patent: Jan. 14, 1992

[54] METHOD AND APPARATUS FOR FORMING FIBER REINFORCED ARTICLES

[76] Inventor: James Holloway, 8 - 310 Clarke St., N., Woodstock, Ontario, Canada, N4S 7N1

[21] Appl. No.: 382,261

[22] Filed: Jul. 20, 1989

[30] Foreign Application Priority Data

Jun. 27, 1989 [CA] Canada .................................. 603987

[51] Int. Cl.$^5$ ............................................. B29C 33/00
[52] U.S. Cl. .................................. 264/258; 264/314; 264/313; 264/257; 156/145; 156/160; 156/156; 428/36.3
[58] Field of Search ............... 264/257, 313, 314, 258, 264/517, 224, 225, 315; 428/36.9, 36.3; 425/110, DIG. 112, DIG. 14; 156/187, 189, 145, 160, 156, 165, 198, 218

[56] References Cited

U.S. PATENT DOCUMENTS

| | | | |
|---|---|---|---|
| 2,739,350 | 3/1956 | Lampman | 18/45 |
| 2,815,534 | 12/1957 | Ising et al. | 18/58 |
| 2,886,853 | 5/1959 | Herman et al. | 18/55 |
| 3,135,640 | 6/1964 | Kepka et al. | 156/147 |
| 4,266,750 | 5/1981 | Gallizia | 249/65 |

FOREIGN PATENT DOCUMENTS

| | | | |
|---|---|---|---|
| 608573 | 1/1965 | Canada | 18/205 |
| 789971 | 7/1968 | Canada | 18/205 |
| 923265 | 3/1973 | Canada | 18/82 |

Primary Examiner—James J. Seidleck
Assistant Examiner—Charles R. Nold

[57] ABSTRACT

The present invention consists of a collapsible hollow core, having a circumferentially variable wall thickness, for use in a method of forming a hollow article. The core is manufactured by extruding a hollow parison into an open core forming mould, closing this mould, expanding the parison against the inner walls of the core forming mould by injecting pressure into the parison, and opening the mould to remove the core. The core thus formed is used in a method of forming a hollow article of a resin reinforced with fibers. The method consists of winding reinforcing fibers tightly around a hollow core having a circumferentially variable wall thickness and placing the wound core in a mould. A differential pressure is then provided between the interior and exterior of the core to cause a thinner wall portion thereof to initiate collapse of the core, and this collapse is continued to an extent necessary to relax the fibers. Fluid resin is then injected into a space between the mould and the collapsed core to fill such space and impregnate and saturate the fibers with resin. The core is expanded to expel excess resin from the mould, and re-tighten the fibers. The resin is hardened and the final article can be removed from the mould.

4 Claims, 6 Drawing Sheets

METHOD AND APPARATUS FOR FORMING FIBER REINFORCED ARTICLES

FIELD OF INVENTION

The present invention involves a method of forming hollow, lightweight fibre reinforced resin articles having superior strength. The method consists of moulding, wrapping and treating articles in a way that maximizes their strength. The method can be applied in production of tool handles, sporting equipment, tanks and containers, as well as lightweight automotive parts, and any other articles where strength is important.

PRIOR ART

Typically, cores of various types having the desired shape of the final article are wound with continuous fibres of glass or other materials in a criss-crossing fashion under modest tension. Various methods are then used to attempt to soak the fibres with liquid resin, and to pre-stress the fibres to maximize strength.

The prior art diverges with regard to core construction. One method uses a core which is solid, and may be surrounded by an inflatable membrane. This allows the fibres to be wrapped under sufficient tension, assuming the membrane is strong enough if used. However, problems such as undercuts can occur upon wrapping fibres around irregularly shaped objects with a solid core. Undercuts do not allow the core to be removed. An example of this is if one were trying to form a bottle shaped container. Once the container has been formed it would be impossible to remove the solid core through the bottleneck and produce the desired hollow article without damaging the construction. Hence solid core methods must be limited to uniformly shaped objects if the core is to be removed.

Another method incorporates a core that is collapsible and covered by an inflatable membrane. While this method avoids the problem of undercuts of an irregularly shaped object, it does not allow fibres to be wrapped about it under adequate tension, since the core and membrane often cannot withstand sufficient inflation pressures to allow high tension winding. As a result, this method requires that the fibres be wound in a looser fashion, thereby sacrificing the strength of the final article produced.

The prior art also concerns itself with techniques of soaking the fibres with resin, which upon setting increases the strength significantly. However, no prior art accomplishes the process of effectively impregnating the fibres with resin, or "wetting out" the fibres completely.

Yet another aspect of the prior art methods is an attempt at pre-stressing the fibres in order to maximize their strength. This has been done rather ineffectively, as sufficient forces cannot be exerted outward with prior cores to stress the fibres effectively.

SUMMARY OF THE INVENTION

The present invention consists of a collapsible hollow core having a circumferentially variable wall thickness, and a method for forming such core. The method comprises: extruding a hollow parison into an open core forming mould that has an inner shape corresponding to that of the final desired core shape; closing the core forming mould, thereby closing off the bottom of the parison; expanding the parison against the inner walls of the core forming mould by injecting pressure in the parison; and opening the mould and removing the core. The core thus formed is used in a method of forming a hollow article of a resin reinforced with fibres comprising: winding reinforcing fibres tightly around the core; placing the wound core in a mould; providing a differential pressure between the interior and exterior of the core to cause a thinner wall portion thereof to initiate collapse of the core and continuing such collapse to an extent necessary to relax the fibres; injecting fluid resin into a space between the mould and the collapsed core to fill such space and impregnate and saturate the fibres with resin; expanding the core to expel excess resin from the mould, and re-tighten the fibres; hardening the resin to form the article; and removing the article from the mould.

DETAILED DESCRIPTION OF THE PREFERRED EMBODIMENTS

Core Forming

Figure 1:
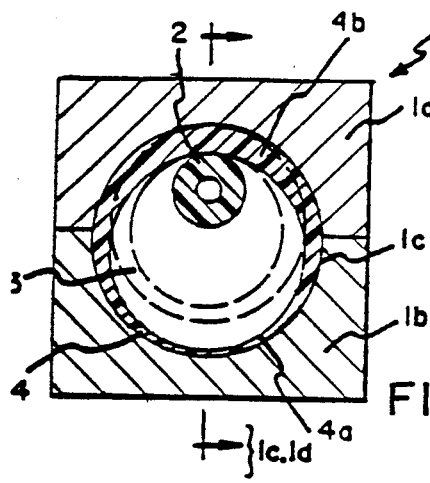
FIG. 1 shows a horizontal sectional view of three stages of core forming for a core with a circular cross section.

FIG. 1 shows a cross-section of the stages in forming a cylindrical hollow core having variable wall thickness. FIGS. 1b through 1d show front sectional views corresponding to FIG. 1. An expandable parison or tube 2, preferably made of thermoplastic material, is extruded into a mould 1, having mould portions 1a and 1b. At this stage the parison is preferably molten, allowing for easier and more complete expansion of the parison within the mould. This extrusion continues until the parison extends beyond the bottom of the mould portions 1a and 1b, as shown in FIG. 1b. Mould portions 1a and 1b are then brought together and the mould is closed, thereby pinching closed the portion of the parison below the bottom of the mould pieces 1a and 1b, and fusing the parison together at the base of the mould as shown in FIG. 1c.

Once the mould is closed the parison is then pressurized with a gas, air for example, until it is sufficiently pressed against the inner surface of the mould 1, forming the expanded core 4 as seen in FIGS. 1 and 1d. More specifically, it is necessary that the formed core have a variable wall thickness in the circumferential direction. This is achieved by portion 4a being significantly thinner than portion 4b.

Briefly, variable wall thickness allows for a more controlled collapse of the core as is required in further stages of the process. Upon de-pressurization, a hollow core having uniform wall thickness will collapse in an unpredictable manner, and will require greater force to collapse since it has uniform rigidity. A core having a variable wall thickness, and hence varying wall strength, allows for a controlled collapse.

Variable wall thickness is achieved during core forming through two possible means, which can be used independently, or together, for an even more significant effect. FIG. 1 depicts a cross-section of one such means. The expandable parison 2 is placed off-centre in the mould 1, that is, the parison is initially significantly nearer one portion of the inner surface 1c (1c indicates the entire inner surface) of the mould 1 than opposing portions. Upon applying pressure, the parison expands and will reach a typical intermediate state 3. As it expands further, the portion of the parison initially furthest from the inner surface 1c will have to be stretched to a greater extent before touching this surface and forming a final core 4. As a result, the portion 4a of the core 4 which has experienced greater stretching will have a thinner wall thickness than those portions, such as portion 4b, that experienced less stretching.

Figure 1A:
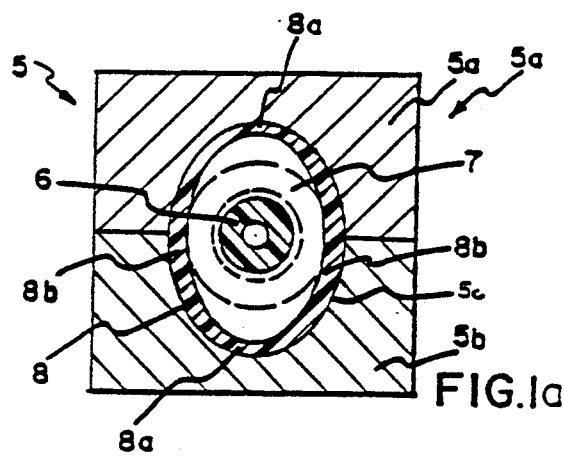
FIG. 1a shows a horizontal sectional view of three stages of core forming for a core with a non-circular cross section.
Figure 1B:
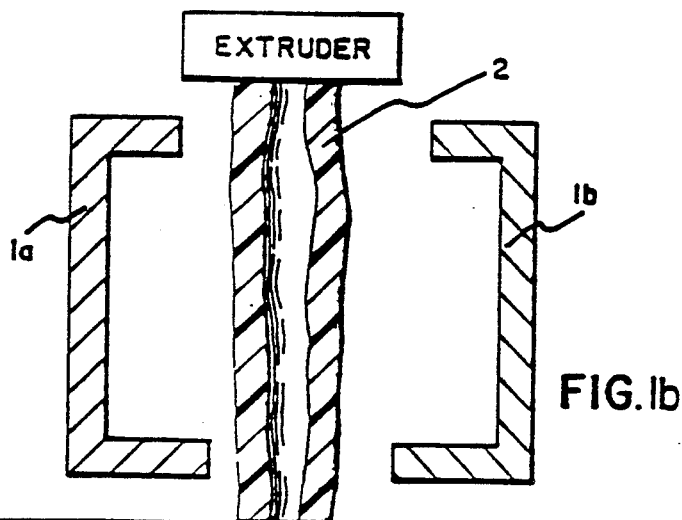
FIGS. 1b through 1d show a front sectional view of the core forming procedure (FIGS. 1-1d are provided as diagrammatic representations and are not intended to be dimensionally accurate)
Figure 1C:
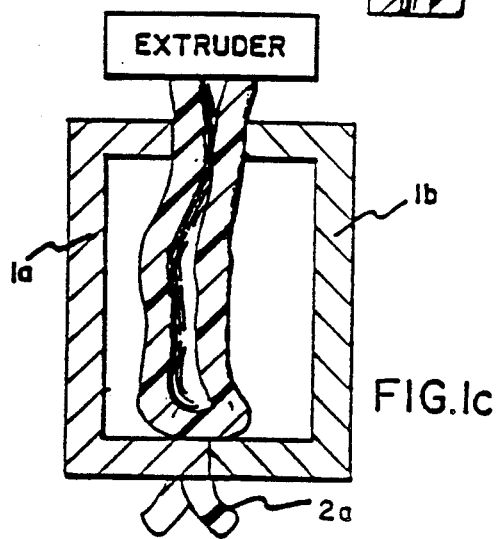
Figure 1D:
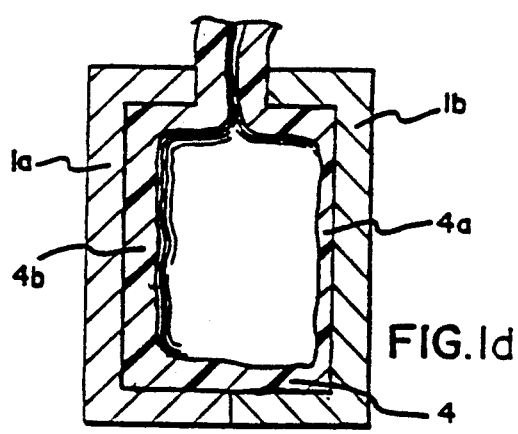

FIG. 1a depicts a cross-section of the second means for forming a core having variable wall thickness. If the core to be formed has a non-circular cross section, a variable wall thickness will result regardless of the initial positioning of the parison 6 in the mould. FIG. 1a shows the formation of a core 8 for subsequently making a hammer handle. Even if the parison 6 is initially placed in the centre of a mould 5 (having mould portions 5a, 5b and an inner surface 5c), a variable wall thickness will result. At an intermediate stage 7, the expanding parison 6 has not yet touched the inner surface 5c of the mould 5, and hence has a uniform wall thickness at this time. However, the final stage core 8 reveals thinner walls at 8a where the expanding parison 6 needed to stretch to a greater extent to touch the mould surface, compared with portion 8b, for example.

As previously mentioned the two above effects can be combined, i.e. to place the parison 6 off centre in the mould 5, to tailor the variance in wall thickness required for a specific application. Finally the mould 1 or 5 is opened to remove the formed core 4 or 8.

Winding of the Core

Figure 2:
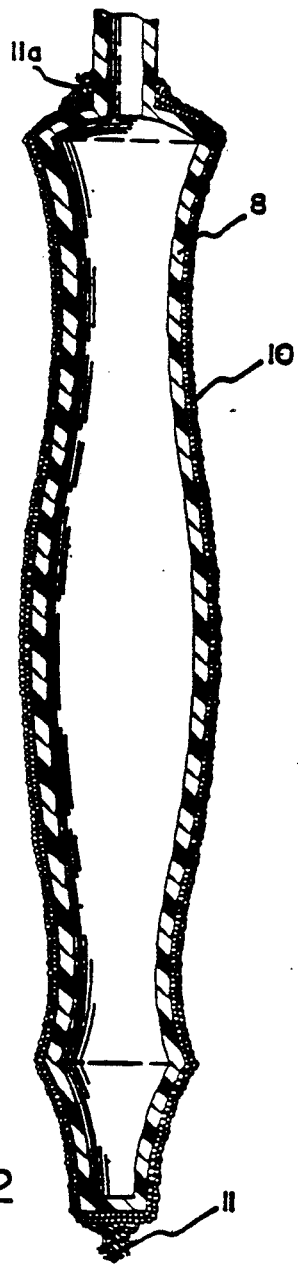
FIG. 2 shows a fully formed and wound core of a hammer handle.

Once the core is formed it can be wound helically with fibreglass fibre bundles, using a method standard in the industry. Typically, two sets of fibres will be wound around the core in opposite directions and, in the case of a hammer handle, tied into knots at opposing ends. This affords the windings the ability to be expandable and contractable as determined by the core and the limits imposed by the tied ends of the fibers. If necessary, the core can be pressurized during winding to provide a sufficiently rigid structure for the fibres to be wound with suitable tension. Typically, a thermoplastic core can easily withstand such pressure. FIG. 2 shows a vertical cross-section of a wound core 8 wound with such fibres 10 knotted at 11 and 11a.

Article forming mould

Figure 3:
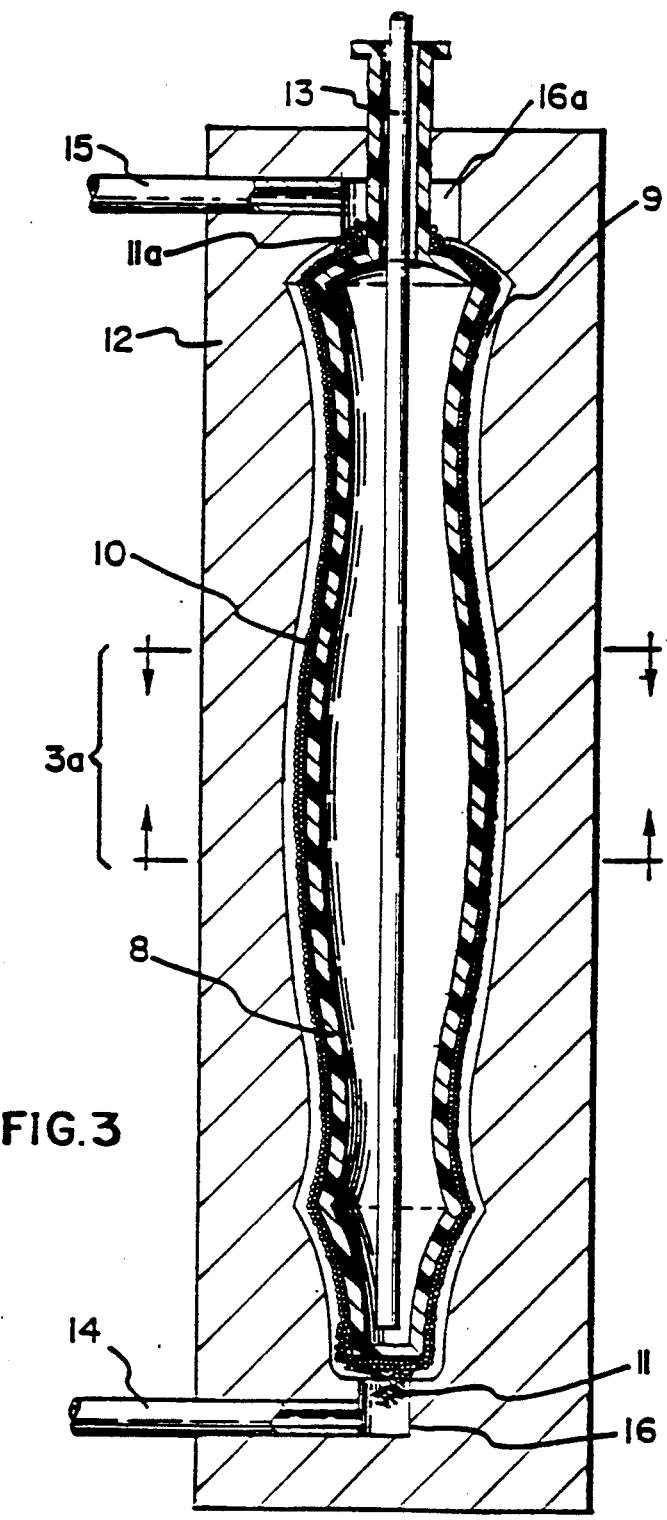
FIG. 3 shows the wound core of FIG. 2 placed in a mould.

Wrapping and tying now complete, the wound core can be placed in a two part mould 12 as depicted in FIG. 3, having a lower port 14 and an upper port 15, both of which communicate with the interior of the mould 12 via reservoirs 16 and 16a respectively. The tied ends remain during core expansion and are trimmed subsequently from the moulded product. A tube 13 extends from outside the mould to a point near the bottom of the core. The tube 13 and the core 8 extend to a valve control mechanism (not shown) outside the mould. The interior of the core thus communicates with the outside of the mould via tube 13. Thus this tube allows increases and decreases in pressure to be applied to the core. Note the spatial gap 9 between the mould 12 and the outer surface of the body of fibres 10, which is necessary in order to coat the fibres effectively with resin and provide the final article with a smooth outer surface. FIG. 3 also indicates the section that is shown on a larger scale in FIG. 3a to aid in the further description of the process below.

Core Collapse

Figure 3A:
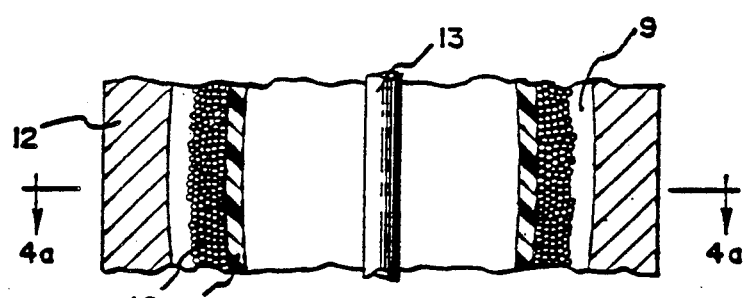
FIG. 3a shows a blown-up portion of FIG. 3.

FIG. 3a shows the core 8 with tube 13 therein and having fibres 10 wound thereon all within the mould 12. At this point it is necessary to collapse the core 8. As the core will have variable wall thickness, a predictable, controlled collapse can be achieved by applying suction to the tube 13. The resulting situation upon collapsing of the core is depicted in FIG. 3b.

Figure 3B:
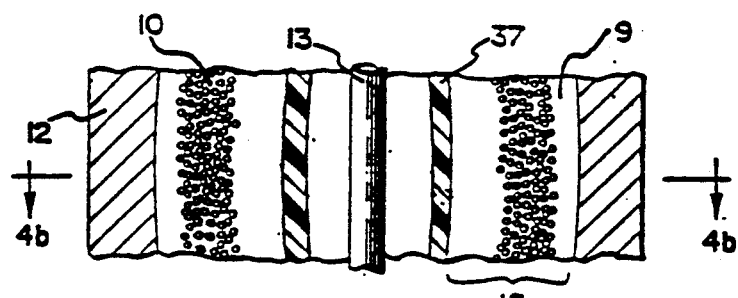
FIG. 3b shows the same view as FIG. 3a after core collapse.

In FIG. 3b, the core is shown collapsed at 37 and has become separated from the wound fibres 10. The body of wound fibres, however, has sufficient rigidity and interlacing support within the fibres not to collapse with the core, resulting in air flowing into a mould cavity 17 between the core and the mould through one or both of the ports 14 and 15. The fibres, instead of collapsing, become relaxed as shown at 10 of FIG. 3b, meaning their relative spatial separation is increased.

Figure 4A:
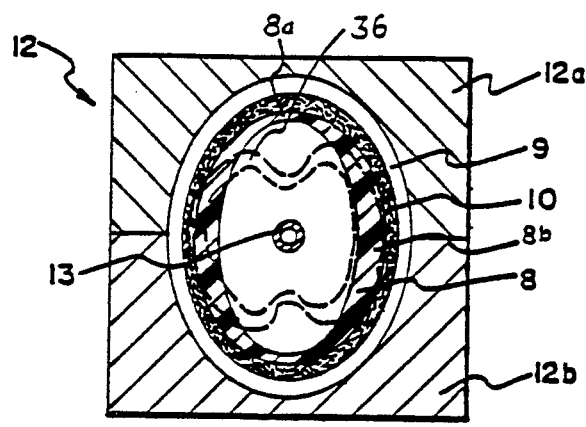
FIG. 4a and 4b show sectional views of the stages of core collapse for a hammer handle.
Figure 4B:
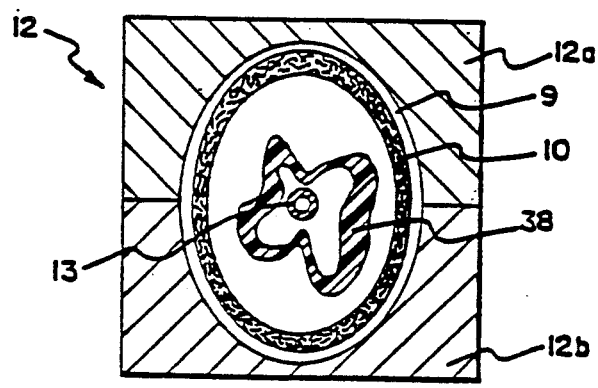

FIGS. 4a and 4b show sections of the stages during collapse of the core 8. Controlled collapse is achieved, as the thinner portions 8a of the core begin to collapse (as shown in broken lines at 36) relatively easily and allow the core to buckle upon application of suction through the tube 13 (or the application of a differential vacuum as explained below). The collapse is controlled because when the thinner wall portions 8a begin to buckle, the thicker wall portions 8b are still rigid enough to resist. This avoids an undesired sudden implosion of the core, which would lead to unpredictable results. The final stage of collapse 38 is shown in FIG. 4b.

Introduction of Resin

Figure 5:
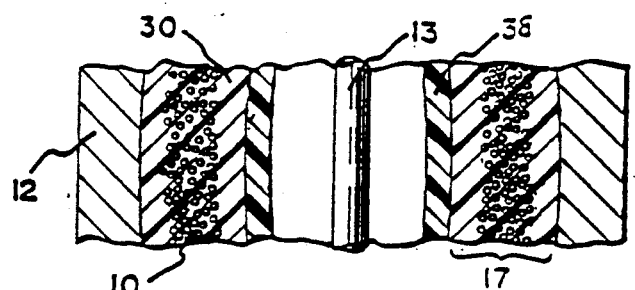
FIG. 5 shows a sectional view similar to FIG. 3b but including liquid resin.

Simultaneous with core collapse, the lower port 14 of the mould is supplied by a resin source, and suction can be applied to the upper port 15. In this embodiment the degree of core collapse is controlled by differential vacuums in the cavity by the tube 13 and the mould cavity (numeral 17 of FIGS. 3b and 5). As a result, upon collapse of the core, the space within the mould outside the core, that is the mould cavity 17, provides a vacuum suitable for drawing thermosetting resin 30, as depicted in FIG. 5, into the mould from port 14. In this specification and claims, the terms "pressure" and "differential pressure" include a vacuum and a differential vacuum. The resin used can be of any standard variety used in industry. FIG. 5 shows the structure of FIG. 3b at this later stage, i.e. resin 30 now filling the mould cavity 17.

This resin 30 penetrates among the loose bundles of fibres to fill the interstices therebetween, while acting as an adhesive, binding the fibres and strengthening the final product, as well as protecting the fibres from environmental stress and physical damage. Superior binding, however, can best be achieved when the resin, in liquid form, is completely embedded between, around and over the wound fibres of an article, thereby forming a "resin matrix" around the fibres. This embedding of fibres with liquid resin is referred to as "wetting out" of the fibres. In one alternative, the resin is forced into the mould at a slow rate while it is open to atmosphere at port 15 and the core is reduced in size by sufficient vacuum (or reduced pressure).

As a further alternative, the resin feed can be kept at such an elevated pressure that it causes collapse of the core without any need to apply a vacuum to the interior of the core which is now vented to atmosphere. While the latter method is simpler, the vacuum method eliminates a greater amount of the entrapped air.

In another embodiment of the present invention the resin entering lower port 14 during core collapse is at an increased temperature. This increases the temperature of the monomer styrene within the resin, thereby increasing its vapour pressure. The vacuum also increases the styrene density incrementally. Increasing the vapour pressure of the styrene in the mould cavity helps displace air particles from among the fibres, further allowing for more complete wetting out of the fibres.

The supply of resin is stopped when the resin exiting through upper port 15 is free from air bubbles. At this point the resin filling stage is complete.

Core Expansion

Figure 6:
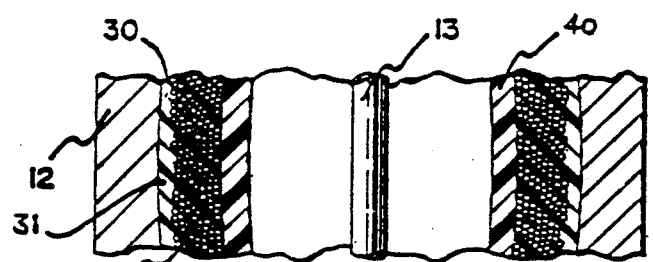
FIG. 6 shows the view of FIG. 5 with the core re-expanded.

Now that the mould has been filled with liquid resin, two important events must occur, both of which are triggered by the next step in the procedure. The collapsed core is re-expanded by internal fluid pressure introduced through the tube 13, under considerable pressure, while still within the mould, resulting in the situation as depicted by FIG. 6.

Upon re-expansion of the core 38 of FIG. 5, the resin 30 presses through the fibres, thereby wetting out the fibres. The pressure applied to re-expand the core can be a hot pressurized liquid introduced into the core 38 through tube 13. Heat is thereby transferred through the core to the resin, reducing its viscosity, increasing its ability to penetrate the fibres, displacing air particles, and speeding the thermosetting process. Resin exudes through the fibre mass and forms a prestressed composite of fibers and resin matrix in forming the final product. An outside layer 31 of resin can be caused to form the outer skin of the final product, although its existance is not mandatory. As an alternative, a film can be applied as a clear or coloured gel-coat to the mould and cured before the moulding process begins. Excess resin exits via ports 14 and 15. These ports are closed when the rate of resin expulsion reduces significantly. At this point the pressure applied to the core is increased slightly and then maintained at a steady state. The heat from the core cures the resin, embedding the fibres into the resin matrix. Pressure within the core is then stopped and the fluid is vacuumed out of the core by means of tube 13.

In addition, during core re-expansion, forces exist axially and radially as the core presses against the fibres. The pressure exerted on the core is directly related to the stress exerted on the fibres. It is known in the industry that the degree of tension on the fibres is directly related to the tensile strength of the final article. That is, to achieve a maximum strength article, it is necessary to place re-enforcing fibres in a state of stress. Having a resilient thermoplastic core allows sufficient force to be applied to stress the fibres effectively.

Upon cooling, the final article can be removed from the mould. The thermoplastic core may be left in place, or removed by heat, chemical, or mechanical means if desired.

Multiple-Wrapped-Articles

Figure 7:
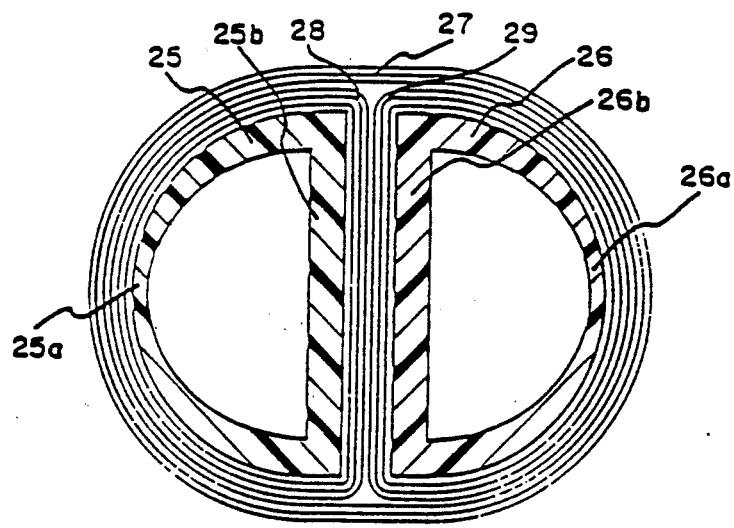
FIG. 7 shows two handle half portions wrapped with a common web of fibres.

FIG. 7 depicts diagrammatically an embodiment of the present invention wherein more than one collapsible core is used to form the final article, in this case a hammer handle. Here two cores 25 and 26, having semi-circular cross sections are depicted. Each core is constructed in a core forming mould in order to have variable wall thickness in the manner previously described. The core 25 has thinner wall portions 25a, and thicker wall portions 25b. The core 26 has thinner wall portions 26a, and thicker wall portions 26b.

Each of the cores 25 and 26 is individually wrapped with fibre bundles 28 and 29 respectively. The wrapped cores are then positioned adjacently as depicted in FIG. 7 and wrapped with a common web of fibres 27. The resulting construction can then be placed in a mould similar to that shown in FIG. 3, and treated in the same fashion as the single-cored object described above. However, here two cores will be both collapsed and re-expanded later once resin has filled the mould cavity. This mould cavity extends between the cores and as a result, all fibres, including those extending between the two cores, can be thoroughly wetted out.

Such a "multi-wrap" article provides even greater strength as a supportive cross member of fibres exists within the outer fibre mass. This concept can be extended to produce a multi-wrapped article using more than two separately wound cores where needed.

The embodiments of the invention in which an exclusive property or privilege is claimed are defined as follows:

1. A method of forming a hollow article of a resin reinforced with fibres comprising:
    (a) winding reinforcing fibres tightly circumferentially around an elongated hollow core having a circumferentially variable wall thickness extending throughout its length;
    (b) placing the wound core in a mould;
    (c) providing a differential pressure between the interior and exterior of the core to cause a thinner wall portion thereof to initiate collapse of the core throughout its length, and continuing such collapse to an extent necessary to relax the fibres;
    (d) injecting fluid resin into a space between the mould and the collapsed core to fill such space and impregnate and saturate the fibres with resin;
    (e) expanding the core to expel excess resin from the mould and re-tighten the fibres;
    (f) hardening the resin to form the article, and
    (g) removing the article from the mould.

2. The method according to claim 1, wherein the fibres are wound around the core under tension, at least two layers of fibre bundles extending helically in opposite directions.

3. The method according to claim 1, wherein said mould has an upper port situated at the top of said mould and a lower port situated at the base of said mould, allowing the interior of the mould to communicate with the exterior of the mould for the purposes of applying pressure to the contents of the mould and allowing fluids to enter the mould.

4. The method according to claim 3, wherein said fluid resin is injected simultaneously with said core collapse by supplying the lower port of said mould with a fluid resin source while core collapse is executed, said collapse creating a pressure within said mould outside said core to allow said resin to fill said mould outside said core.

* * * * *